(12) United States Patent
Viviani et al.

(10) Patent No.: US 9,242,700 B1
(45) Date of Patent: Jan. 26, 2016

(54) WAKESURFING BOAT

(71) Applicant: 3MADMEN, Monaco (MC)

(72) Inventors: Albert Viviani, Monaco (MC); Arye Laniado, Monaco (MC); Joshua Laniado, Monaco (MC); Yann Le Jeune, Villefranche sur Mer (FR); Pietro Lagioia, Bari (IT); Christer Widmark, Göteborg (SE)

(73) Assignee: 3MADMEN, Monaco (MC)

( * ) Notice: Subject to any disclaimer, the term of this patent is extended or adjusted under 35 U.S.C. 154(b) by 0 days.

(21) Appl. No.: 14/676,305

(22) Filed: Apr. 1, 2015

(51) Int. Cl.
| B63B 1/32 | (2006.01) |
| B63H 1/14 | (2006.01) |
| B63H 21/32 | (2006.01) |
| B63H 1/26 | (2006.01) |
| B63B 13/00 | (2006.01) |
| B63B 35/73 | (2006.01) |

(52) U.S. Cl.
CPC . B63B 1/32 (2013.01); B63B 13/00 (2013.01); B63B 35/73 (2013.01); B63H 1/14 (2013.01); B63H 1/26 (2013.01); B63H 21/32 (2013.01)

(58) Field of Classification Search
USPC .......................................... 114/288, 274, 271
IPC ................................................ B63B 1/20,1/042
See application file for complete search history.

(56) References Cited

U.S. PATENT DOCUMENTS

| 652,876 | A | 7/1900 | Andrade |
| 1,204,355 | A | 11/1916 | Hickman |
| 1,316,762 | A | 9/1919 | Bigelow |
| 1,620,349 | A | 3/1927 | Hickman |
| 1,644,725 | A | 10/1927 | Hickman |
| 1,670,623 | A | 5/1928 | Hickman |
| 1,681,342 | A | 8/1928 | Hickman |
| 2,285,959 | A | 6/1942 | Dubay |
| 2,423,796 | A | 7/1947 | Platt |
| 2,515,005 | A | 7/1950 | Hickman |
| D197,099 | S | 12/1963 | Torreson |
| 3,191,572 | A | 6/1965 | Allen |
| 3,200,782 | A | 8/1965 | Walden et al. |

(Continued)

FOREIGN PATENT DOCUMENTS

| EP | 0 466 382 A1 | 1/1992 |
| EP | 1075415 B1 | 2/2001 |

(Continued)

OTHER PUBLICATIONS

European Search Report for Application No. 12196282.3-1754; Mar. 27, 2013; 8 pages.

*Primary Examiner* — Stephen Avila
(74) *Attorney, Agent, or Firm* — Martin & Ferraro, LLP

(57) ABSTRACT

A wakesurfing boat for creating a wave suitable for surfing in the wake of the boat. A length to beam (L/B) ratio of 3.21 combined with a rounded hull bottom proximate the transom minimizes losses in the wake wave. Elliptical arcuate portions extending from starboard and port points on the transom to selected positions on the respective starboard and port bulwarks further minimize losses in the wake wave. The hull bottom defines an M-shaped portion and a V-shaped portion. A propulsion system includes an exhaust pipe projecting from the hull bottom below the waterline, with an exhaust opening forward of the transom. A propeller has a hub and at least three blades. A blade area, defined by a sum of the area of the blades, is larger than 70% of a disk area, defined by a sum of the hub and the blades.

21 Claims, 14 Drawing Sheets

(56) References Cited

U.S. PATENT DOCUMENTS

| | | |
|---|---|---|
| 3,330,239 A | 7/1967 | Dornak |
| 3,342,154 A | 9/1967 | Le Marec |
| 3,503,358 A | 3/1970 | Moesly |
| D219,555 S | 12/1970 | Field |
| D219,795 S | 1/1971 | Field |
| 3,675,605 A | 7/1972 | Knerr |
| 3,709,179 A | 1/1973 | Payne |
| 3,797,437 A | 3/1974 | Cowles |
| 3,800,725 A | 4/1974 | L'Heureux |
| 3,902,445 A | 9/1975 | Stolk |
| 4,192,248 A | 3/1980 | Moyer |
| 4,478,166 A | 10/1984 | Sorensen |
| D301,573 S | 6/1989 | Fuller |
| D302,969 S | 8/1989 | Pipkorn |
| D306,631 S | 3/1990 | Aguilar |
| 4,922,844 A | 5/1990 | Solia |
| D318,041 S | 7/1991 | Meredith |
| 5,140,930 A | 8/1992 | Lund |
| 5,231,949 A | 8/1993 | Hadley |
| 5,265,554 A | 11/1993 | Meredith |
| 5,351,641 A | 10/1994 | Robson |
| D355,881 S | 2/1995 | Carlson |
| 5,419,274 A | 5/1995 | Van Diepen |
| 5,427,048 A | 6/1995 | Takeuchi |
| 5,458,078 A | 10/1995 | Perette |
| 5,474,014 A | 12/1995 | Russell |
| 5,526,762 A | 6/1996 | Kiley |
| 5,549,071 A | 8/1996 | Pigeon et al. |
| D382,850 S | 8/1997 | Schmidt |
| 5,655,473 A | 8/1997 | Arvilla |
| 5,664,910 A | 9/1997 | Lochtefeld et al. |
| 5,718,184 A | 2/1998 | Holland |
| D400,156 S | 10/1998 | Duvenage et al. |
| 5,860,384 A | 1/1999 | Castillo |
| 5,860,766 A | 1/1999 | Lochtefeld et al. |
| D405,411 S | 2/1999 | Schmidt |
| D418,104 S | 12/1999 | Bove |
| 6,044,708 A | 4/2000 | Hirosawa |
| 6,047,657 A | 4/2000 | Cox |
| 6,105,527 A | 8/2000 | Lochtefeld et al. |
| 6,192,819 B1 | 2/2001 | Larson et al. |
| 6,250,245 B1 | 6/2001 | Robinson et al. |
| 6,293,216 B1 | 9/2001 | Barsumian |
| 6,314,903 B2 | 11/2001 | Robinson et al. |
| 6,374,762 B1 | 4/2002 | Larson et al. |
| 6,526,903 B2 | 3/2003 | Robinson et al. |
| 6,604,478 B2 | 8/2003 | Barsumian |
| 6,708,642 B1 | 3/2004 | Taylor |
| 6,868,798 B2 | 3/2005 | Robinson et al. |
| 6,941,884 B2 | 9/2005 | Moore |
| 6,983,713 B1 | 1/2006 | Robinson et al. |
| 7,063,031 B2 | 6/2006 | Earl, Jr. et al. |
| 7,093,553 B2 | 8/2006 | Robinson et al. |
| 7,252,047 B1 | 8/2007 | Baucom, Jr. |
| 7,305,926 B2 | 12/2007 | Seider |
| 7,316,193 B1 | 1/2008 | Greenbaum |
| D570,278 S | 6/2008 | Horais |
| 7,418,915 B2 | 9/2008 | Campbell |
| D581,340 S | 11/2008 | Fafard et al. |
| 7,458,332 B2 | 12/2008 | Wilson et al. |
| D595,204 S | 6/2009 | Robinson |
| 7,578,250 B2 | 8/2009 | Baker |
| 7,625,153 B2 | 12/2009 | Sauerbier |
| 7,677,190 B2 | 3/2010 | Miller |
| 7,677,192 B2 | 3/2010 | Scism et al. |
| 7,699,016 B2 | 4/2010 | Larson et al. |
| D643,357 S | 8/2011 | Moore et al. |
| 8,011,313 B2 | 9/2011 | Sasayama |
| D651,551 S | 1/2012 | Moore et al. |
| 8,109,221 B2 | 2/2012 | Graf et al. |
| 8,281,730 B2 | 10/2012 | Munson |
| 8,590,475 B2 | 11/2013 | Viviani et al. |
| 8,857,364 B2 | 10/2014 | Viviani et al. |
| 2003/0041791 A1 | 3/2003 | Chollet et al. |
| 2004/0129192 A1 | 7/2004 | Guerard |
| 2009/0308300 A1 | 12/2009 | Baker |
| 2010/0275829 A1 | 11/2010 | Sporsheim |
| 2011/0017115 A1 | 1/2011 | Olofsson |
| 2013/0145978 A1 | 6/2013 | Viviani |

FOREIGN PATENT DOCUMENTS

| | | |
|---|---|---|
| JP | 1-95991 | 4/1989 |
| WO | WO 98/36961 A1 | 8/1998 |

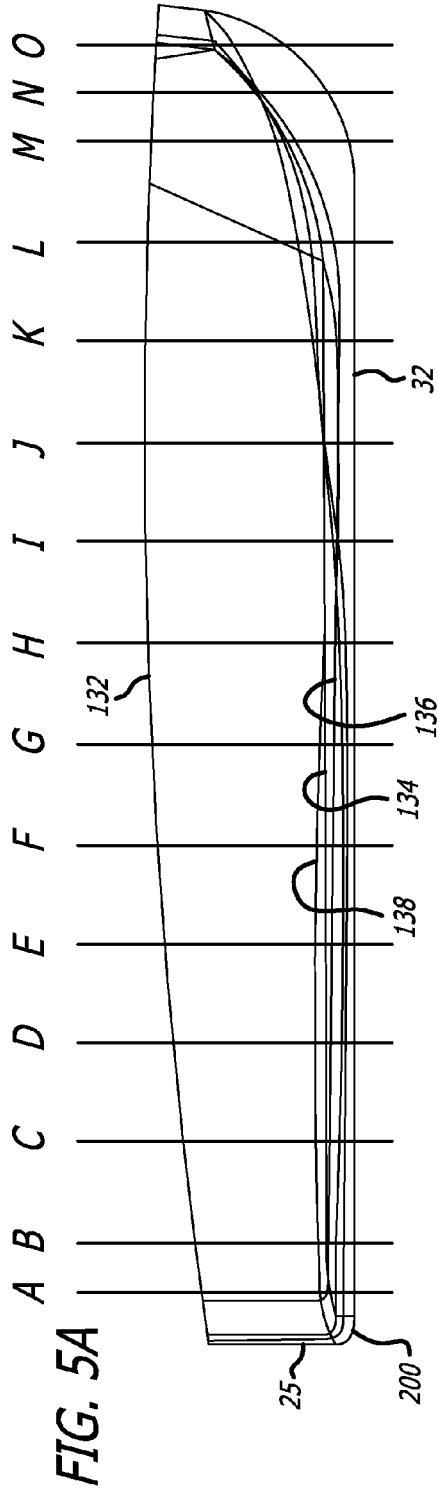
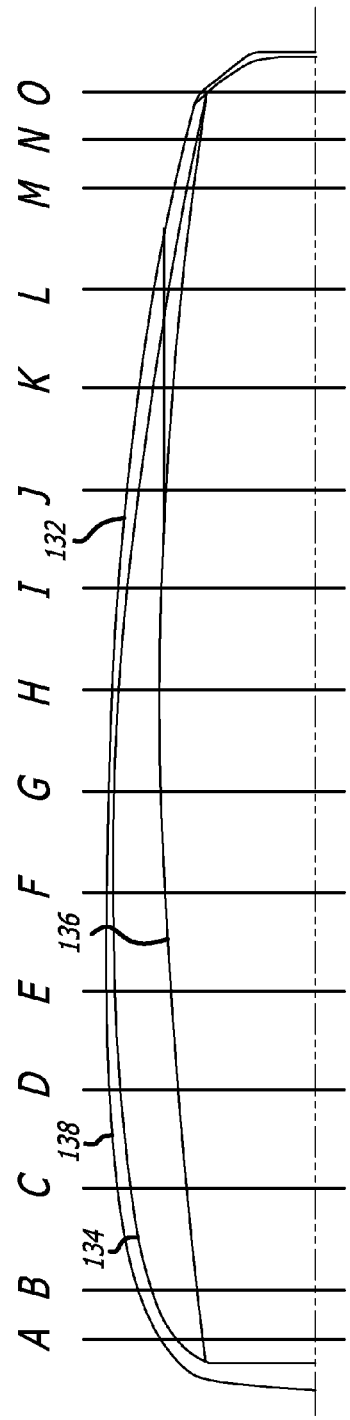
FIG. 5A
FIG. 5B

FIG. 14A
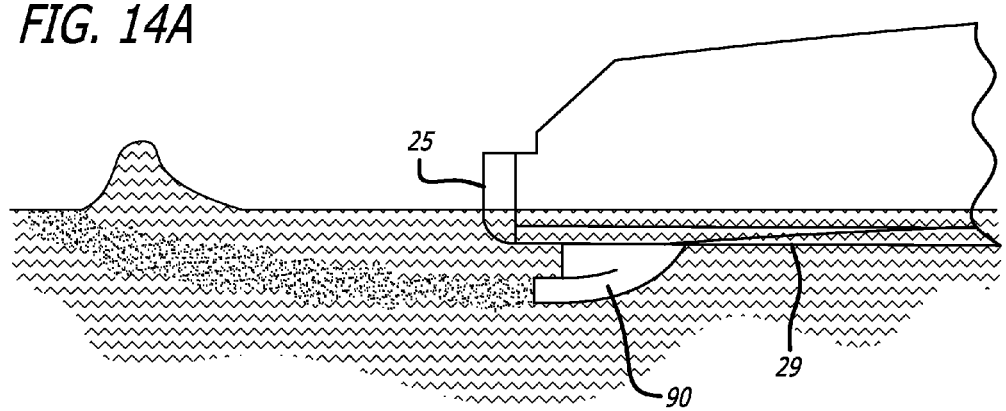
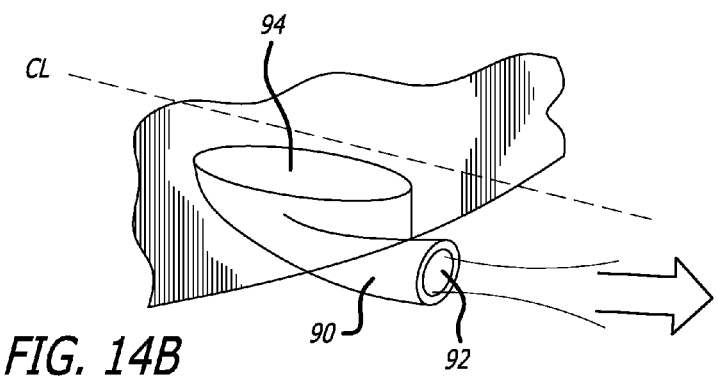
FIG. 14B
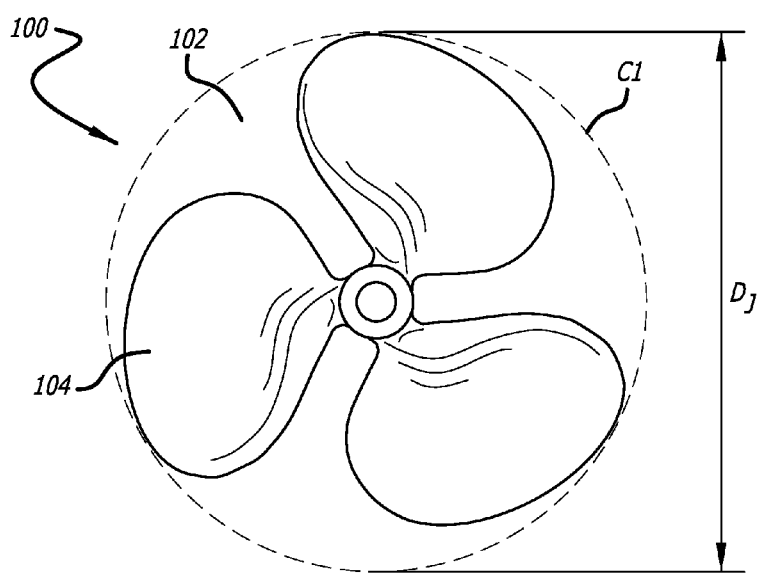
FIG. 15

WAKESURFING BOAT

BACKGROUND OF THE INVENTION

The present invention relates to a wakesurfing boat, having a hull configuration adapted to produce a relatively large, long-lasting, and well-shaped wave in the wake of the boat, on which a wakesurfer can ride on a surfboard, similar to surfing on a natural ocean wave.

DESCRIPTION OF THE PRIOR ART

Wakesurfing is a watersport that is rapidly growing in popularity. A wakesurfer, being towed behind a boat, while standing on a surfboard and holding onto a tow rope, rides on a wave created in the wake of the boat, similar, in some respects, to a waterskier or a wakeboarder. Ideally, the boat should generate, in its wake, a wave that as closely as possible mimics a size, a shape of a face, a shape of a crest, and a duration, of an ocean wave. If the wake wave reaches a sufficient size, shape, and duration, the wakesurfer, unlike a waterskier or a wakeboarder, can release the tow rope, and ride the surfboard on the crest and the face of the wake wave, traversing back and forth on the wake wave, similar to an ocean surfer.

Until now, wakesurfers have been attempting to surf primarily in the wakes of existing cruising boats, waterskiing boats, and wakeboarding boats. A problem with attempting to wakesurf behind such traditional boats, however, is that such boats fail to generate sufficiently large, sufficiently well-shaped, and sufficiently long-lasting wake waves necessary to give the wakesurfer a long, satisfying ride. Traditional boats also release engine exhaust gases into the air in the surfing area in the wake of the boat, causing discomfort to the wakesurfer.

As is known in the field of fluid dynamics, a boat, when passing through a body of water, creates separate waves that move in the boat's wake. In general, separate wake waves originate, respectively, from the boat's bow, centerline, quarter, and stern. Each wake wave generally forms the arms of a V, with the source of the respective wake wave being at the point of the V (i.e., the boat), and transverse curled wave crests forming offset from the path of the boat. Wake wave height is a function of several factors, including for example, a speed of the boat on the surface of the water, resistance to the boat as it moves through the water, a shape of the bottom of the hull, a length of the hull, a length/beam (L/B) ratio of the hull, a speed/length ratio (SLR) of the hull, a Froude number (Fr) of the hull, an amount of the bottom of the hull in contact with the body of water, hull displacement, hull trim, and an efficiency of the boat's propeller at the relatively high loads associated with wake surfing.

SUMMARY OF THE INVENTION

It is an object of the present invention to provide a wakesurfing boat that provides, in its wake, a relatively large, relatively long-lasting, and relatively well-shaped wake wave, mimicking as closely as possible an ocean wave, in order to give a wakesurfer a long satisfying surfing experience substantially similar to that of an ocean surfer.

It is another object of the present invention to provide a wakesurfing boat and a hull for a wakesurfing boat capable of operating in separate modes, including a cruising mode, a static surfing mode, and a dynamic surfing mode.

It is a further object of the invention to provide a wakesurfing boat, configured with a ballast system capable of moving ballast rapidly and efficiently, in order to change the trim and displacement of the boat rapidly and efficiently, to thereby rapidly and efficiently shift the modes of operation.

It is a further object of the present invention to provide a wakesurfing boat configured to maximize wave resistance to the boat and the hull, to transform the power from the engine, and to maximize the efficiency of the propeller, in order to generate as much wave power as possible.

It is a further object of the present invention to provide a wakesurfing boat configured to substantially prevent engine exhaust from being released behind the first wave crest and entering the air in the surfing area aft of the boat, thereby minimizing or preventing discomfort to the wakesurfer caused by the exhaust gases.

These and other objects of the present invention will be apparent from review of the following specification and the accompanying drawings.

In view of the above objectives of the invention, a wakesurfing boat as depicted, disclosed, and claimed below, substantially obviates one or more of the shortcomings of the related art.

A wakesurfing boat includes a hull, the hull having a bow, a stern, a transom positioned at the stern, a starboard bulwark, a port bulwark, a length L between the bow and the stern, a transom positioned at the stern, a beam B between the starboard and port bulwarks, a bottom, and a centerline CL extending between the bow and the stern.

The boat, moving through water, creates a wake with minimum losses when the hull has a L/B ratio of approximately 3.21 with a rounded portion on the hull bottom proximate the transom. The rounded portion defines a fillet between the hull bottom and the starboard and port bulwarks proximate starboard and port points on the transom. The rounded portion on the hull bottom has a maximum radius related to the beam B of approximately 0.04(B).

The hull also has starboard and port arcuate portions defined on the starboard and port bulwarks, respectively, proximate the stern, extending outboard from the respective starboard and port points on the transom forward to respective starboard and port positions on the starboard and port bulwarks. The starboard and port arcuate portions each extend forward a distance equal to approximately 0.3(L). The starboard and port arcuate portions define partial arcs of starboard and port ellipses, each ellipse defined by a major radius equal to 0.2(L) to 0.4(L), preferably 0.3(L) and a minor radius equal to 0.2(B) to 0.3(B), preferably 0.24(B).

The respective starboard and port points on the transom are positioned spaced to starboard and port, respectively, of the CL. Each of the starboard and port points is spaced from the centerline by a distance equal to 0.26(B).

The bottom of the hull defines an M-shaped portion, a V-shaped portion, a generally flat portion where the M-shaped portion meets the V-shaped portion, and a rounded portion proximate the transom.

The M-shaped portion on the hull bottom extends from a position proximate the bow aft to a position located intermediate the bow and the stern, i.e., amidships, and more specifically, 0.4(L) to 0.5(L), measured aft from the bow.

The V-shaped portion on the hull bottom extends from the transom to the amidships position, located approximately 0.4(L)-0.5(L) aft of the bow. At the transom, an angle $\alpha$ is defined by the V-shaped portion of 100. Angle $\alpha$ of the V-shaped portion decreases steadily to 7° at the amidships position where the hull bottom begins to transform into the M-shaped portion.

The wakesurfing boat further includes a ballast system and a propulsion system.

The propulsion system includes at least an engine and an exhaust pipe with an exhaust aperture. The exhaust pipe extends below the waterline of the hull and is attached to a wing-shaped body having a full wing profile between the bottom of the hull and the exhaust aperture. The exhaust aperture, through which the engine exhaust gases are omitted, is positioned forward of the transom. As a result of the above combination of structural features, exhaust gases are emitted below the wake wave aft of the transom, not in the air of the surfing area aft of the transom.

The propulsion system further includes a propeller. The propeller has a preselected disc area and a preselected blade area. The preselected blade area is larger than the preselected disc area by approximately 70%.

The boat's ballast system includes a plurality of ballast tanks, piping, and pumps for routing ballast water into the boat, between the ballast tanks, and overboard, as desired by a user of the boat. A controller, operated by a boat operator, controls operation of both the ballast system and the propulsion system. The controller enables the boat operator to selectively change acceleration, speed, ballast, trim, and displacement, in order to operate the wakesurfing boat in different modes of operation, including at least a cruising mode, a static surfing mode, and a dynamic surfing mode.

BRIEF DESCRIPTION OF THE DRAWINGS

FIG. 5a is a starboard side profile view of the wakesurfing boat in accordance with the invention, depicting locations along the length of the hull of spaced cross-sectional cuts A-O at preselected locations between them stern and the bow, respectively;

FIG. 5b is an upper plan view of the wakesurfing boat in accordance with the invention, depicting the location of the spaced cross-sectional cuts shown in FIG. 6;

FIG. 10b is a side perspective view depicting the rounded stern portion of FIG. 10a;

FIG. 14a is a side view depicting the configuration of an exhaust pipe in the wakesurfing boat in accordance with the invention, and the location of the exhaust pipe aperture in relation to the transom;

FIG. 14b is a perspective view depicting the configuration of the exhaust pipe of FIG. 14a;

FIG. 15 is a front view of a propeller used in the wakesurfing boat in accordance with the invention;

DETAILED DESCRIPTION OF THE PREFERRED EMBODIMENT

Figure 1:
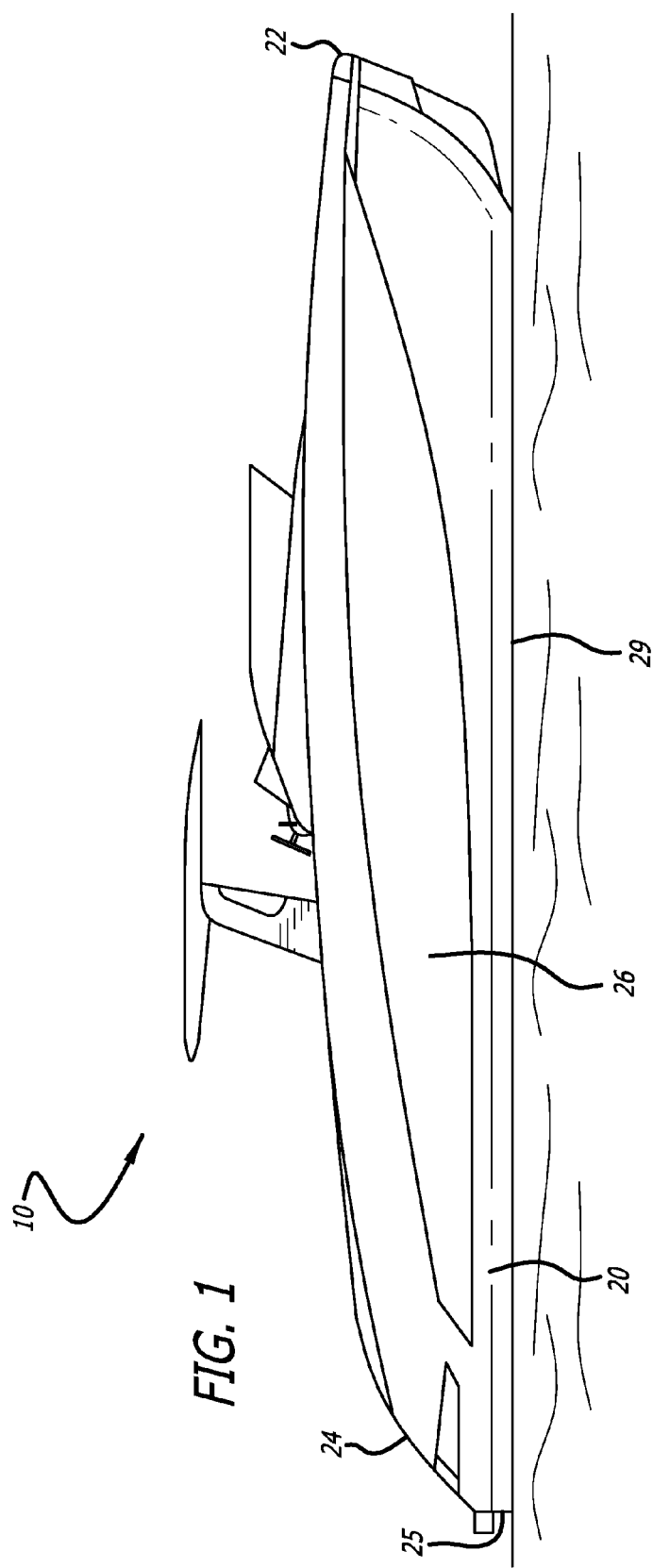
FIG. 1 is a side view of a wakesurfing boat in accordance with the invention.
Figure 2:
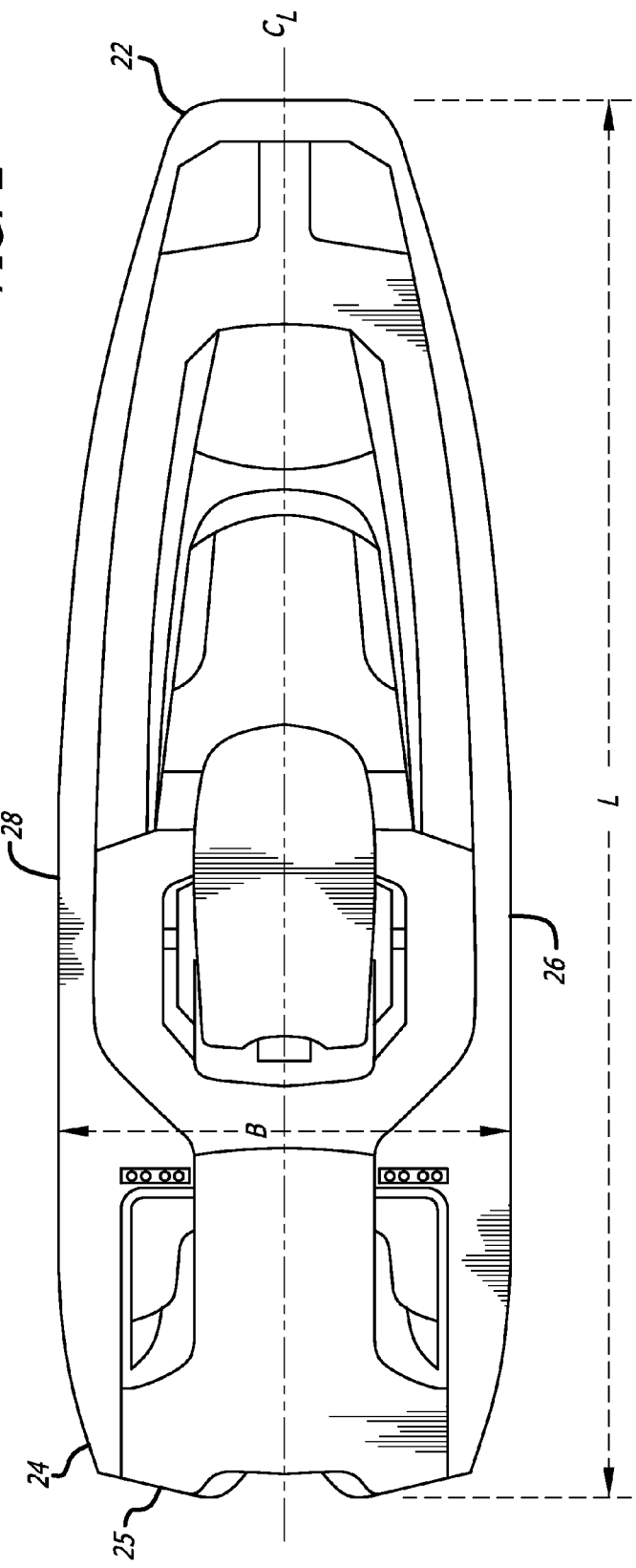
FIG. 2 is a top view of the wakesurfing boat in accordance with the invention.
Figure 3:
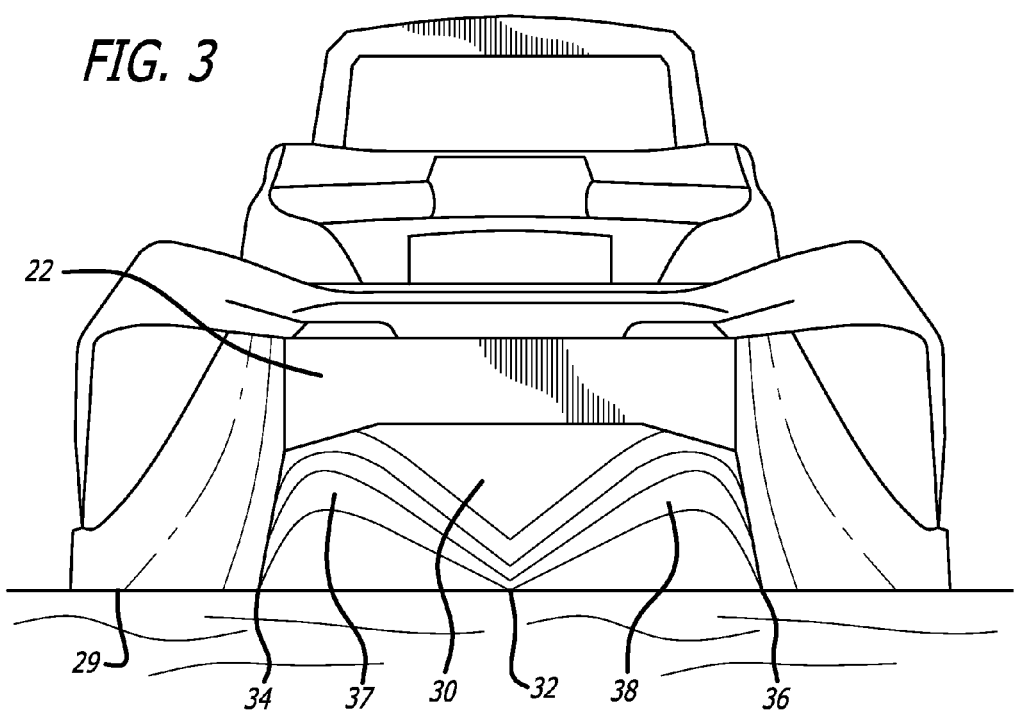
FIG. 3 is a front view of the wakesurfing boat in accordance with the invention.
Figure 4:
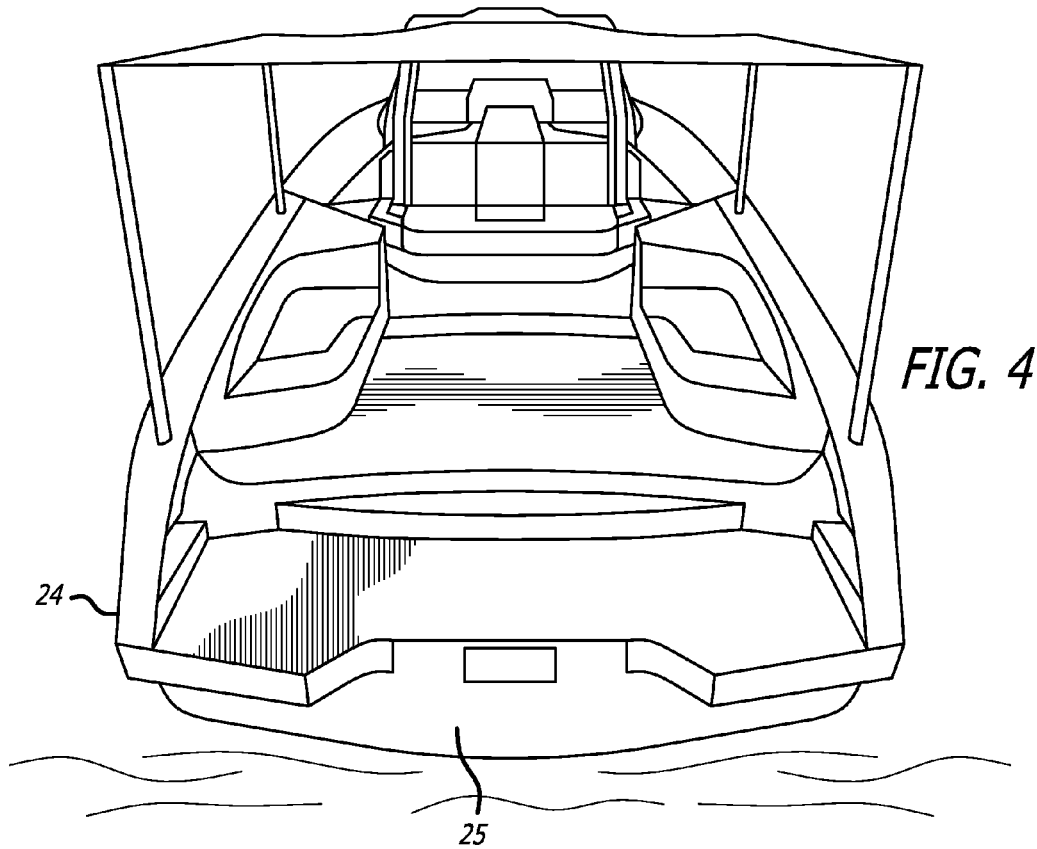
FIG. 4 is a rear top perspective view of the wakesurfing boat in accordance with the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the attached claims.

In accordance with the invention, and as broadly embodied in FIGS. 1-7, a wakesurfing boat 10, in accordance with the present invention, includes a hull 20. The hull 20 includes a bow 22, a stern 24, a transom 25 positioned at the stern, a starboard bulwark 26, a port bulwark 28, a centerline CL extending between the bow 22 and the stern 24 intermediate the starboard and port bulwarks 26, 28, a length L between the bow 22 and the stern 24, a beam B between the starboard bulwark 26 and the port bulwark 28, and a hull bottom 29. In one preferred embodiment, the length L of the hull is 13.37 meters. In one preferred embodiment, the maximum beam B is 4.54 meters. The actual preferred length L and beam B, however, will be selected to achieve a preferred length to beam (LUB) ratio, as discussed below.

In accordance with the invention, and as embodied in FIGS. 3, 5a, 5b, 6, and 7a, an M-shaped portion 30 is defined on the hull bottom 29. The M-shaped portion 30 includes a central vertex 32, defined by a keel line of the hull, a starboard vertex 34, a port vertex 36, a starboard nadir 37, and a port nadir 38. Referring to FIGS. 5a and 5b, the bottom 29 of the hull 20 further includes a sheer line 132, first and second inner chines 134 and 136 on each of the starboard and port bulwarks, respectively (the chines on the starboard bulwark 26 are shown in FIG. 5a, and the chines on the port bulwark 28 are shown in FIG. 5b). An outer chine 138 is also defined on each bulwark. The starboard and port vertices 34 and 36 of the M-shaped portion 30 correspond to forward portions of the first inner chines 136. Referring to FIG. 7a, the M-shaped portion 30 extends from the bow 22, along the bottom 29 of the hull 20, to a position P1, substantially amidships on the bottom 29 of the hull 20, between 0.4(L), and 0.5 (L) measured aft from the bow. The M-shaped portion 30 increases mass, and consequently increases efficient displacement, by trapping water and building up a bow wave between the starboard vertex 34 and the port vertex 36. The starboard and port vertices 34 and 36 also divide flow of the surface water under the bottom 29 of the hull 20, and direct spray towards the center of the bottom 29, thereby minimizing spray on the bulwarks of the hull 20 in the dynamic surfing mode $M_{sd}$, thereby increasing the wave quality in the wake, leaving a more clean surface flowing aft, and providing a clean surface area to the wake wave.

Figure 6:
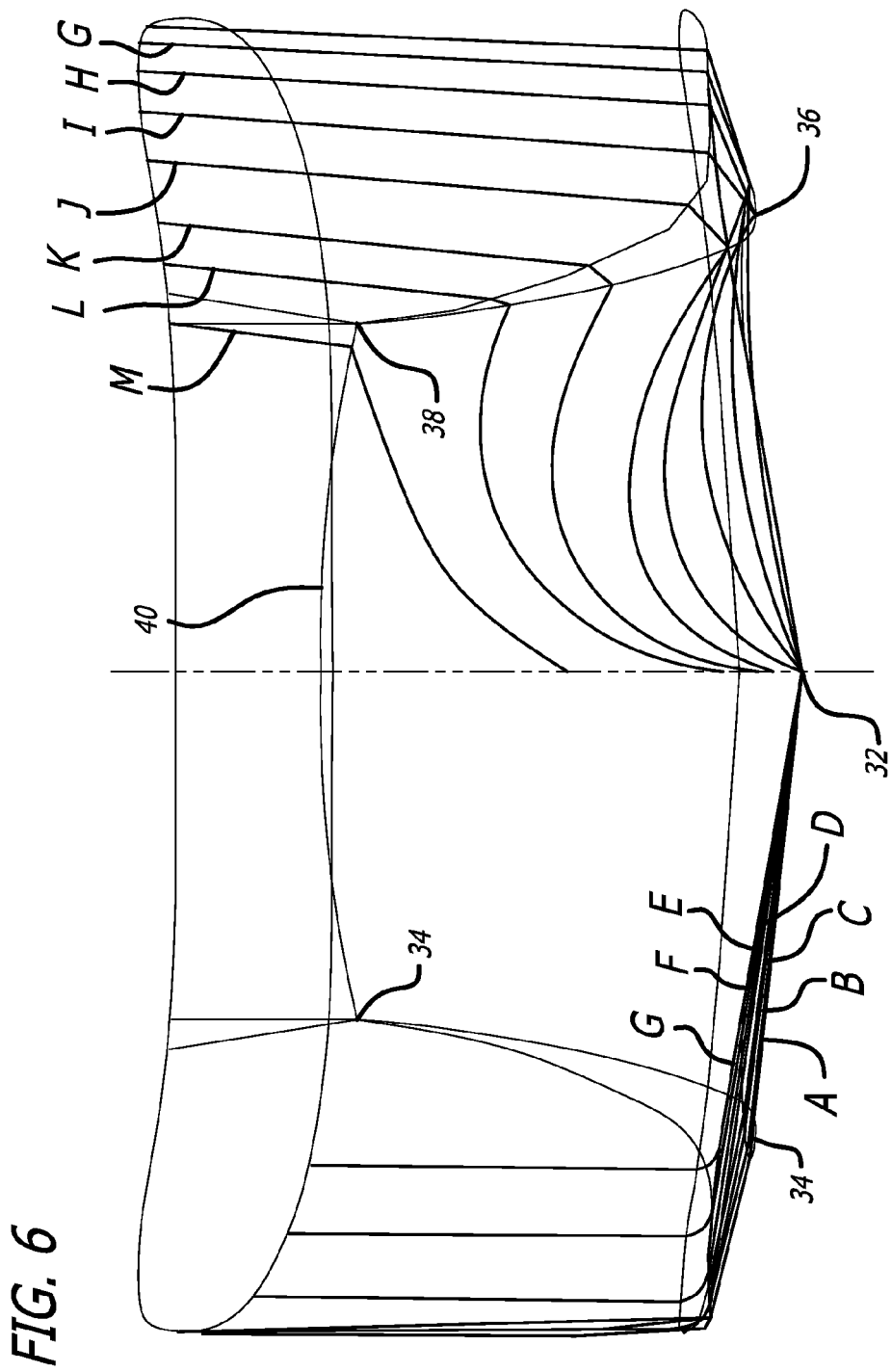
FIG. 6 is a body plan view of the wakesurfing boat in accordance with the invention, depicting the relative shape of each of the cross-sectional cuts A-O shown in FIGS. 5a and 5b.
Figure 7:
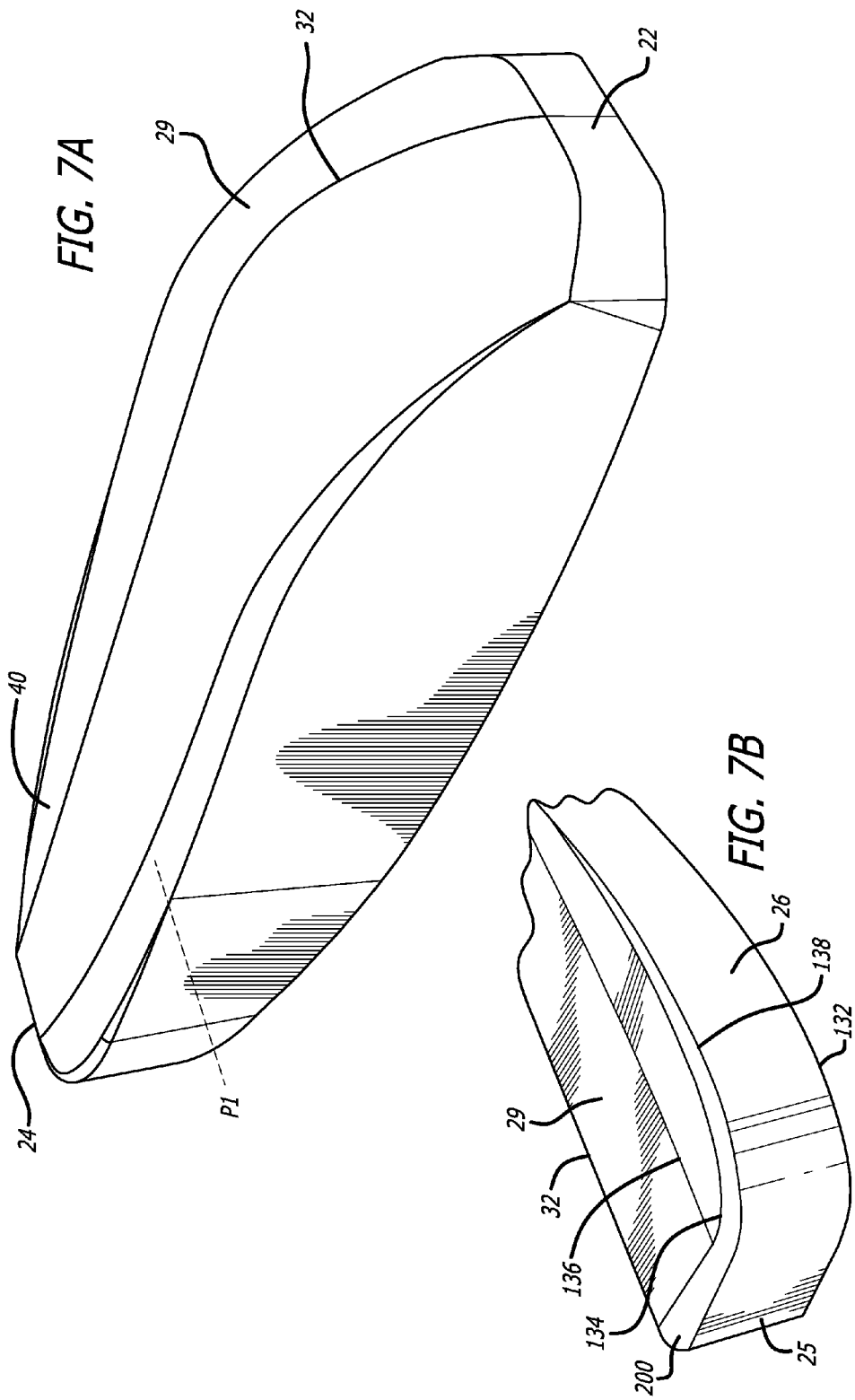
FIG. 7a is a front perspective view of a hull bottom in accordance with the invention.
FIG. 7b is an upper perspective view depicting stern details of a hull in accordance with the invention.

In accordance with the invention, and as embodied in FIGS. 6 and 7a, a V-shaped portion 40 is defined on the bottom 29 of the hull 20, extending from the transom 25 to the amidships position P1 where the bottom transforms into the M-shaped portion 30. The V-shaped portion 40 defines an angle $\alpha$ of 10° at the transom 25. Angle $\alpha$ decreases steadily along the length of the V-shaped portion 40 until it reaches an angle of 7° at amidships position P1. The transition of the V-shaped portion 40 to the M-shaped portion 30 at position P1 results in a section of the hull bottom which is relatively flat and nearly rectangular, a configuration which is beneficial for carrying an amount of ballast needed when the boat operates in the dynamic surfing mode $M_{sd}$. At the position P1, the outer chine 138 transforms into a forward outer chine portion, and an aft outer chine portion. In addition, at position P1, the first inner chine 134 converts into a forward first inner chine portion, and an aft first inner chine portion. Likewise, at position P1, the second inner chine 136 transforms into a forward second inner chine portion, and an aft second inner chine portion. The starboard and port forward second inner chine portions correspond to the starboard and port vertices 34 and 36, respectively, of the M-shaped portion 30. The combination of these bow, stern, and mid-hull configurations contributes to the capability of the hull 20 to carry a large quantity of ballast, and a wake wave having relatively high quality, quantified in height, steepness, and smoothness of the wave crest and wave face. The 10° angle at the transom 25 also assists in the creation of a large surfing wave.

Figure 8:
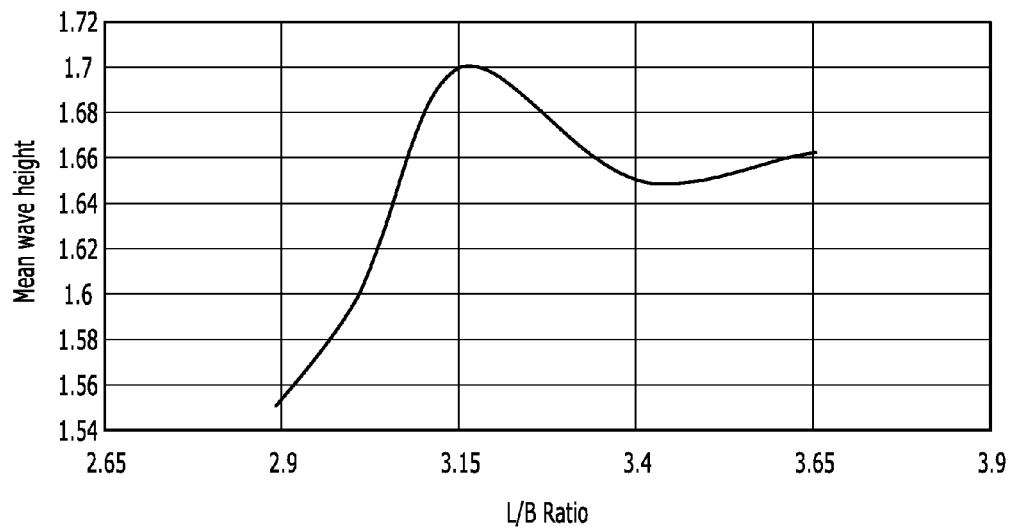
FIG. 8 is a graph depicting an optimum length to beam ratio LJB to obtain a large wave using the wakesurfing boat in accordance with the invention.
Figure 19:
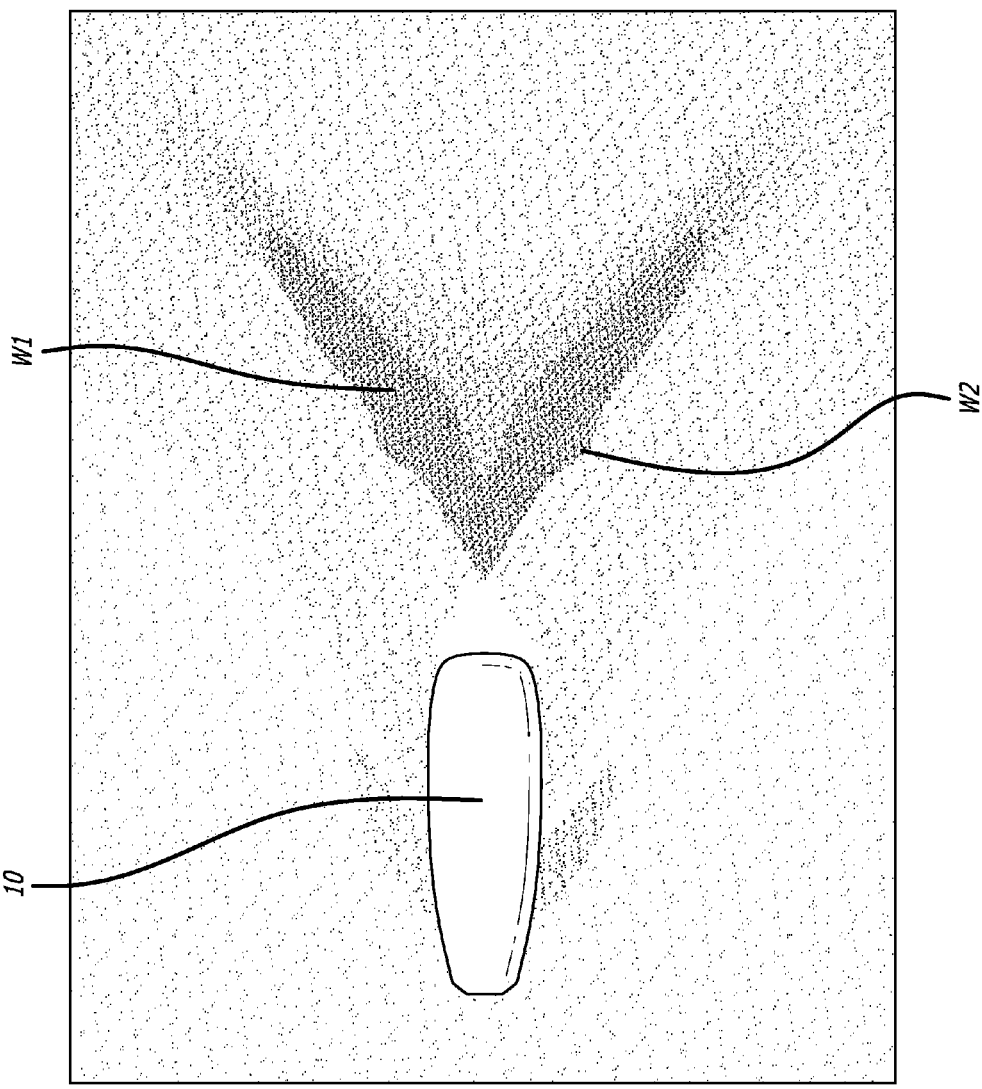
FIG. 19 is a top view graphically depicting a wave in the wake of a wakesurfing boat, in accordance with the invention, operating in a dynamic surfing mode.

In accordance with the invention, the hull 20 includes a preferred length to beam ratio L/B. As embodied in FIG. 8, a preferred L/B ratio is 2.9 to 3.65, preferably 3.1 to 3.3, and most preferably, in accordance with the invention, 3.21. The optimum L/B ratio of 3.21, with a rounded hull bottom proximate the transom, results in a closed wake wave. The closed wake wave meets a "rooster tail" of the wake, producing a diverging wake wave, with wave components W1 and W2 on starboard and port sides of the boat, respectively, as shown in FIG. 19. This optimum L/B ratio, combined with the rounded hull bottom proximate the transom, also results in the wake wave having minimum losses.

Figure 10A:
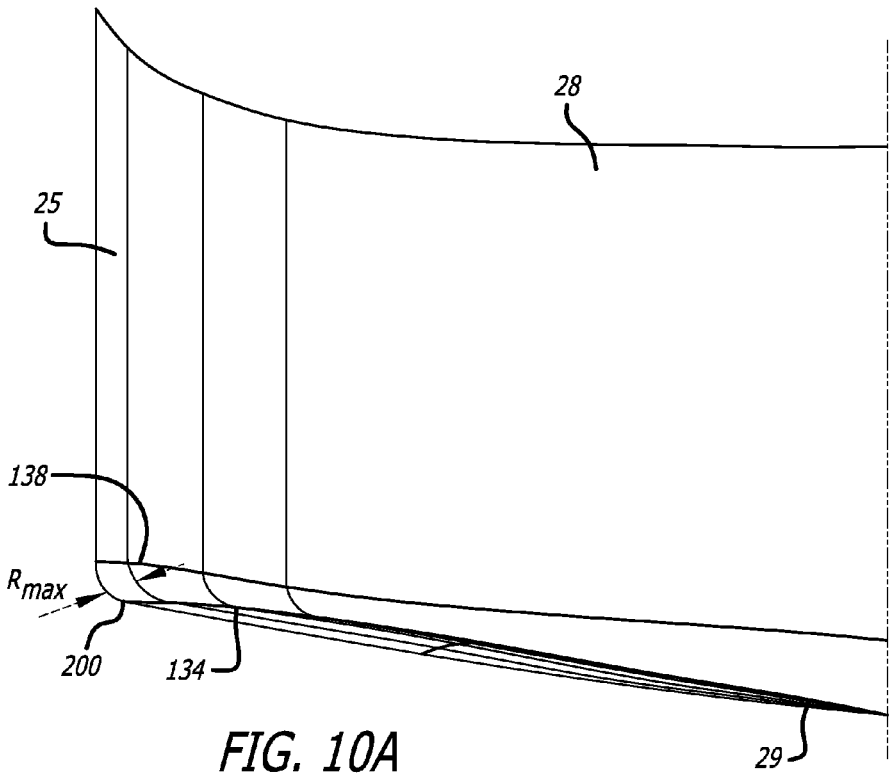
FIG. 10a is a side view of the stern of the wakesurfing boat in accordance with the invention, depicting a rounded stern portion connecting the hull bottom to the starboard bulwark and the transom.
Figure 10B:
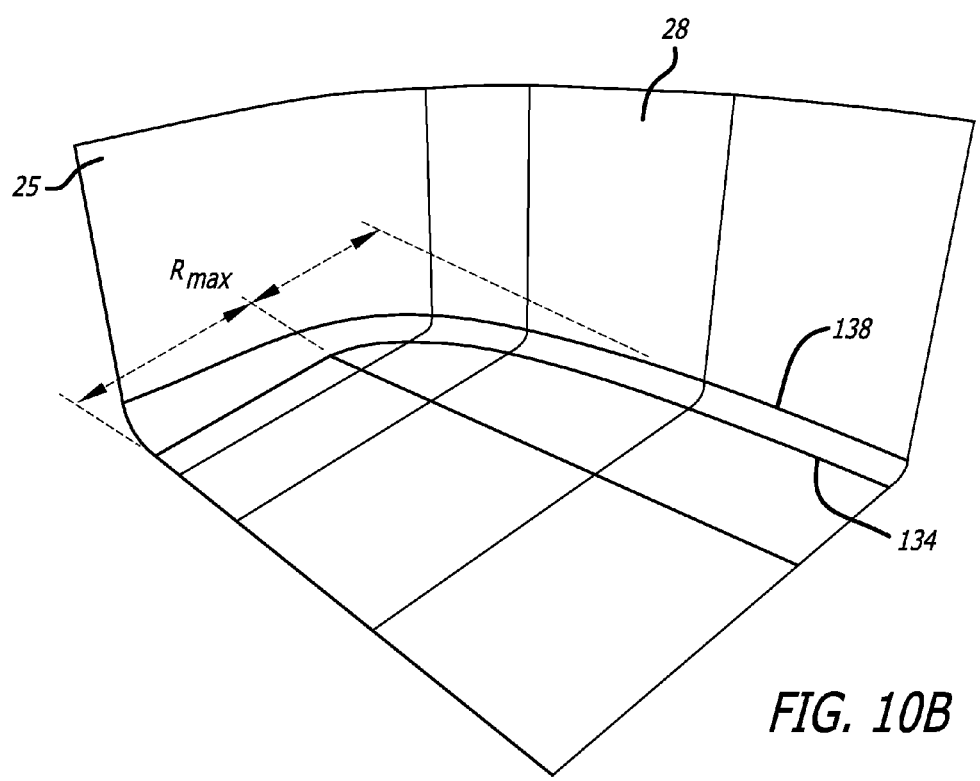

As broadly embodied in FIGS. 5a, 5b, 7b, 10a, and 10b, a rounded portion 200, between the aft portion of the first inner chine 134 and the aft portion of the outer chine 138, is defined on the bottom 29 of the hull 20, proximate the transom 25, thereby defining a fillet between the bottom 29 and the respective starboard and port bulwarks 26 and 28 at starboard and port points 55 and 56 defined on the transom 25. Each of the starboard and port points 55 and 56 on the transom 25 are located, respectively, spaced to starboard and port of the centerline CL by an amount equal to 0.26(B), defining a total distance between the transom points 55 and 56 of 0.52(B). In a preferred embodiment, the rounded portion 200, as depicted in FIG. 10a, has a maximum radius relative to the beam B of 0.03(B) to 0.05(B), and most preferably 0.04(B). In the presently preferred embodiment, this maximum radius of 0.04(B) is equal to 154 mm. The rounded portion 200, combined with the preferred L/B ratio of 3.21 minimizes losses due to turbulence in the wake wave.

Figure 9:
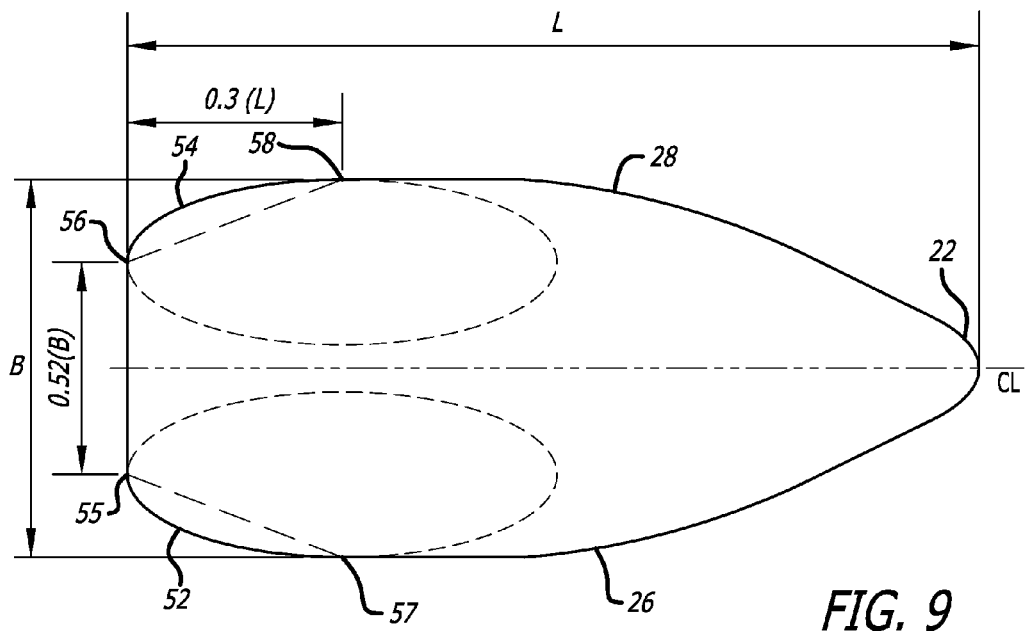
FIG. 9 is a top view of the hull of the wakesurfing boat in accordance with the invention, proximate the stern, depicting laterally-projecting arcuate portions extending between starboard and port endpoints on the transom to respective starboard and port positions on the respective starboard and port bulwarks, configured to minimize losses from turbulence and speed gradients in the wake, each arcuate portion defining an arc of a respective ellipse.

To further minimize losses in the wake wave from turbulence and large speed gradients, and in accordance with the invention, a portion of the aft hull body, proximate the stern 24, in a horizontal plane, is rounded, with the rounded aft hull body Intersecting the transom 25 and the starboard and port bulwarks 26 and 28 of the hull 20. In accordance with the invention, and as broadly embodied in FIG. 9, the hull 20 includes starboard and port arcuate portions 52 and 54, extending outboard from the respective starboard and port points 55 and 56 on the transom. The starboard and port arcuate portions 52 and 54 have generally partially-elliptical shapes each arcuate portion defining a partial arc of a respective starboard and port ellipse proximate the transom 25, as depicted in FIG. 9, each of the ellipses being defined by a major radius equal to 0.2(L) to 0.4(L), preferably 0.3(L), and a minor radius equal to 0.2(B) to 0.3(B), preferably 0.24(B). The starboard and port arcuate portions 52 and 54 extend from the starboard and port transom points 55 and 56, forward to respective starboard and port positions 57 and 58 on the starboard and port bulwarks 26 and 28 of the hull 20. A preferred distance that the starboard and port arcuate portions 52 and 54, respectively, extend from the respective starboard and port transom points 55 and 56, to the respective starboard and port bulwark positions 57 and 58 is between 0.2(L)-0.4 (L), preferably 0.3(L). The outboard rounding of the bulwarks 26 and 28 proximate the transom 25 increases the amount that the hull 20 sinks during the dynamic surfing mode $M_{sd}$, thereby increasing hull displacement and resultant wake wave height.

Figure 11:
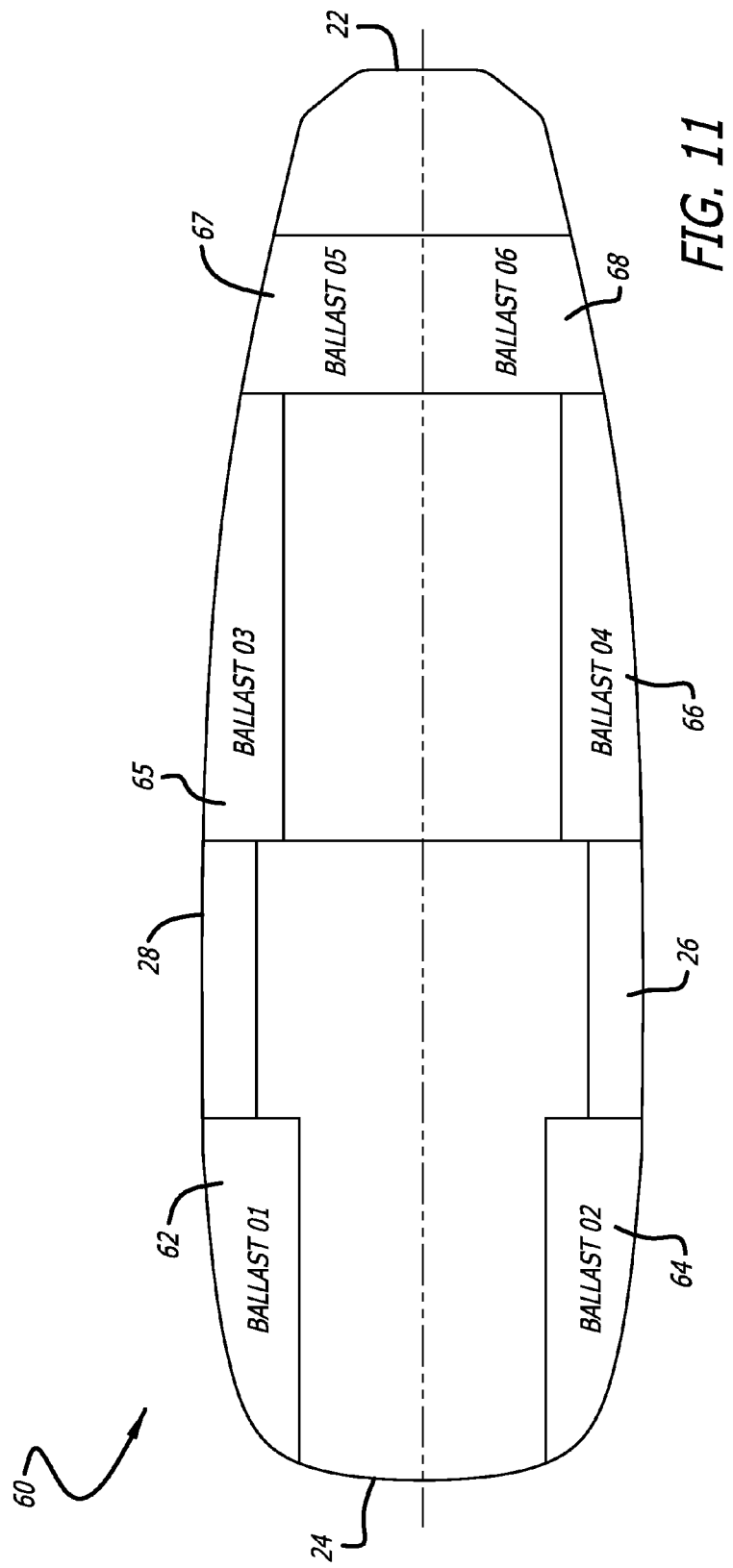
FIG. 11 is a top plan view depicting a preferred location of ballast tanks in the wakesurfing boat in accordance with the invention.

In accordance with the invention, and as broadly embodied in FIG. 11, a ballast system 60 preferably includes six (6) ballast tanks, including a first ballast tank 62, a second ballast tank 64, a third ballast tank 65, a fourth ballast tank 66, a fifth ballast tank 67, and a sixth ballast tank 68, positioned at alternating positions above the hull bottom 29, adjacent the starboard and port bulwarks 26 and 28, between the stern 24 and the bow 22. FIG. 10 also depicts the position of the center of buoyancy CB of the hull 20. Preferably, the first ballast tank 62 has a total capacity of 2,549 liters, a longitudinal center of gravity (LCG) of 1.81 meters, a vertical center of gravity (VCG) of 0.59 meters, and a transverse center of gravity (TCG) of 1.59 meters. Preferably, the second ballast tank 64 has a total capacity of 2,549 liters, an LCG of 1.81 meters, a VCG of 0.59 meters, and a TCG of −1.59 meters. Preferably, the third ballast tank 65 has a total capacity of 2,910 liters, an LCG of 7.65 meters, a VCG of 0.69 meters, and a TCG of 1.63 meters. Preferably, the fourth ballast tank 66 has a total capacity of 2,910 liters, an LCG of 7.65 meters, a VCG of 0.69 meters, and a TCG of −1.63 meters. Preferably, the fifth ballast tank 67 has a total capacity of 1,975 liters, an LCG of 10.72 meters, a VCG of 0.87 meters, and a TCG of 0.79 meters. Preferably, the sixth ballast tank 68 has a total capacity of 1,975 liters, an LCG of 10.72 meters, a VCG of 0.87 meters, and a TCG of −0.79 meters.

As further broadly embodied in FIGS. 1a and 1b, the ballast system 60 includes a ballast tank piping and pumping system 70. The ballast tank piping and pumping system 70 includes a plurality of ballast tank filling pipes 72, a plurality of ballast tank discharge pipes 74, and overflow vent pipes 77, with each of the various pipes 72, 74, 75, and 77 being associated with respective ballast tanks. In addition, the ballast tank piping, pumping, and control system 70 includes associated flow regulation valves, throttle valves, choke valves, and gate valves 76, ballast water pumps 78, and a controller 79. The controller 79 enables the operator of the wakesurfing boat 10 to manually or automatically control operation of the pumps 78 and valves 76, in order to selectively fill and drain various ballast tanks as desired. The configuration, and the principles of operation, of the automatically-controlled ballast piping and pumping system 70 are conventional, and known to persons of ordinary skill in the art, and therefore will not be further discussed here.

Figure 12A:
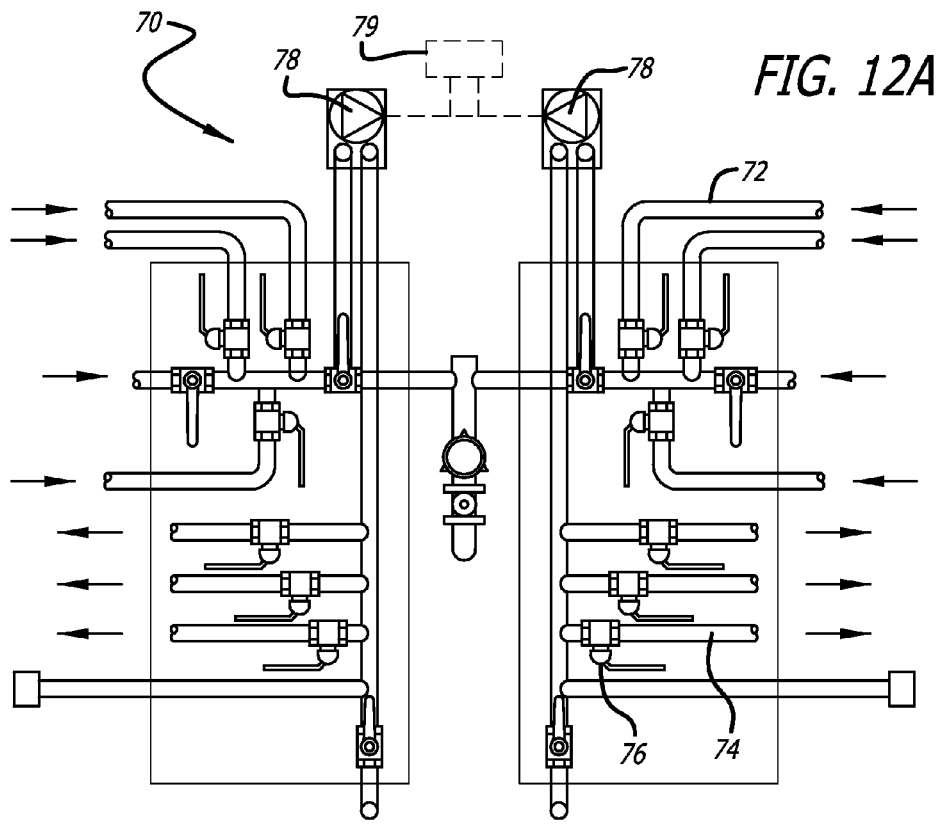
FIG. 12a is a plan view depicting system details of ballast pipes and pumps, used with the ballast tanks depicted in FIG. 11 in the wakesurfing boat in accordance with the invention.
Figure 12B:
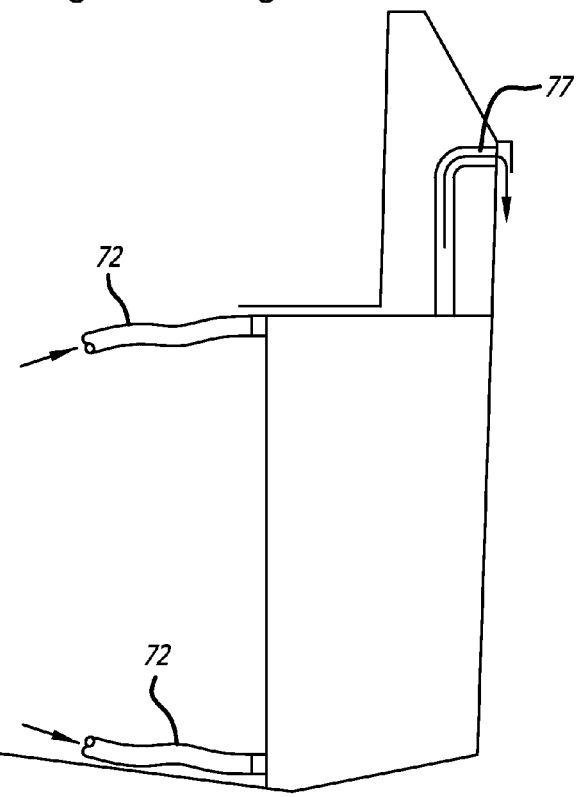
FIG. 12b is a cross-sectional view of a ballast tank of FIG. 11, depicting a ballast filling and discharge principle for the ballast tank.
Figure 13:
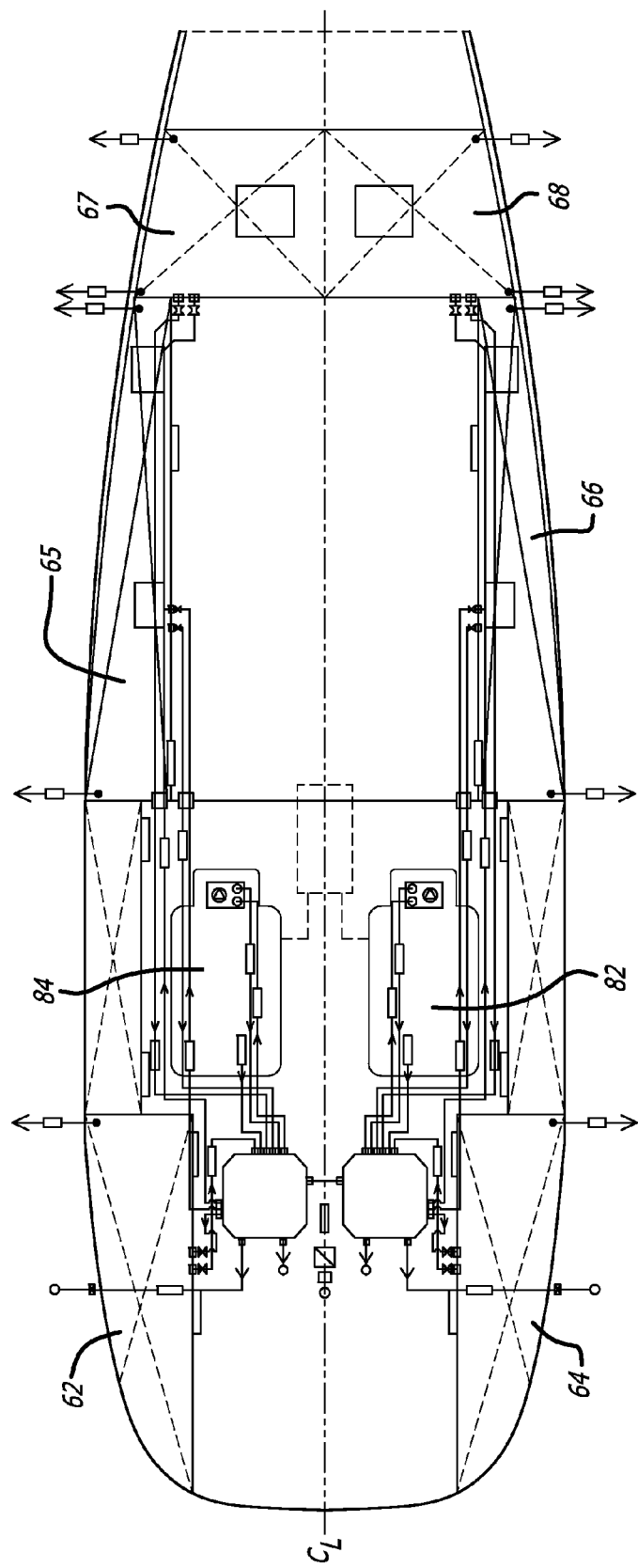
FIG. 13 is a top plan view depicting a portion of a propulsion system in the wakesurfing boat in accordance with the invention, and an interaction of the propulsion system, and the ballast system in the wakesurfing boat in accordance with the invention.
Figure 16:
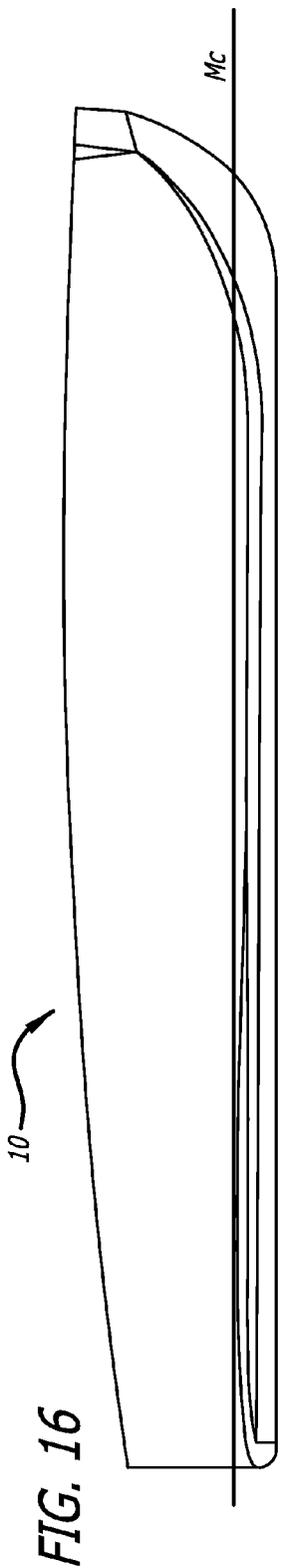
FIG. 16 is a side view of a wakesurfing boat in accordance with the invention, in a cruising mode.
Figure 17:
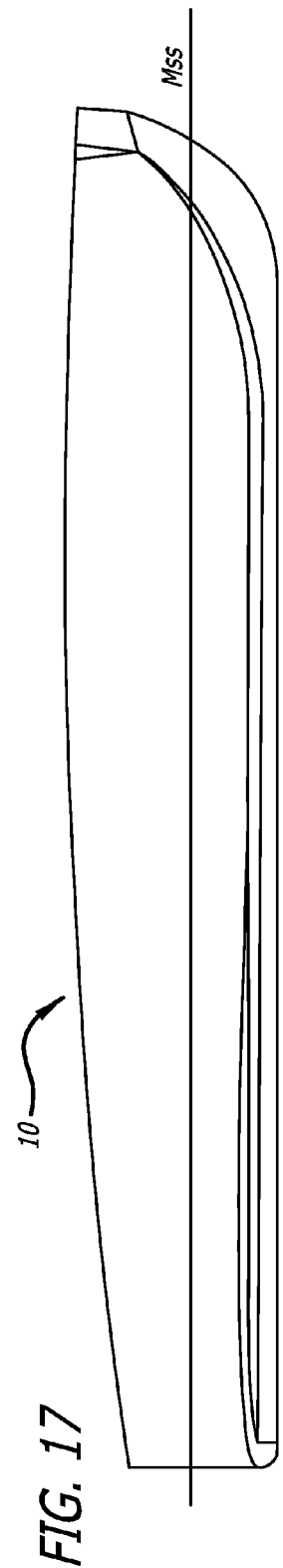
FIG. 17 is a side view of a wakesurfing boat in accordance with the invention, in a static surfing mode.
Figure 18:
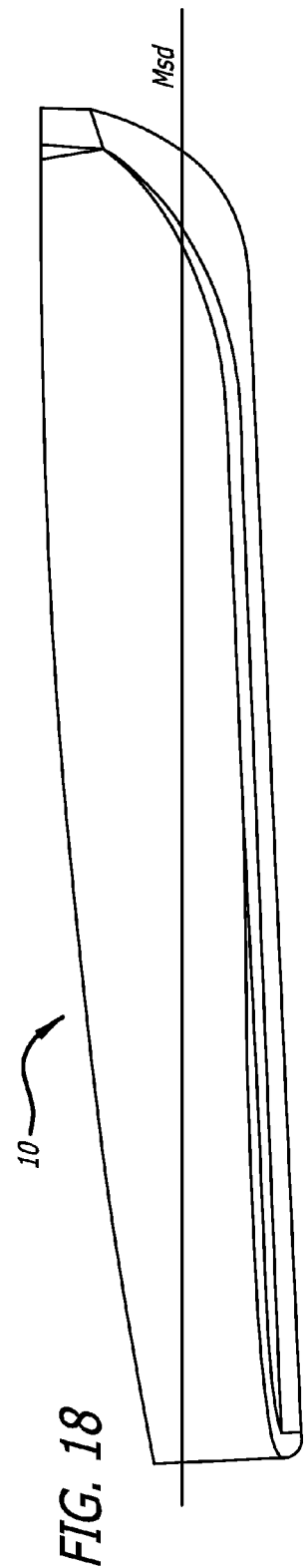
FIG. 18 is a side view of a wakesurfing boat in accordance with the invention, in a dynamic surfing mode.

In accordance with the invention, and as broadly embodied in FIGS. 12-13, a propulsion system 80 includes starboard and port engines 82 and 84, an engine exhaust discharge pipe 90, a propeller shaft (not shown), and a propeller 100. The controller 79, operated by the boat operator, in addition to controlling the ballast tank piping and pumping system 70, also controls the main engines 82 and 84 to regulate the speed of the wakesurfing boat 10. The speed of the wakesurfing boat 10, in combination with the ballast tank load, and the resultant trim and displacement of the wakesurfing boat 10, results in an ability to operate the boat 10 in different modes of operation, as explained below.

In accordance with the invention, and as broadly embodied in FIG. 12, the engine exhaust discharge pipe 90 extends from the transom 25 below the hull bottom 29 and offset from the centerline CL, with an exhaust opening 92 being defined in the exhaust pipe 100 mm forward of the transom 25. The exhaust from the engines 82 and 84, as a result, is released submerged in the water, and is carried aft in the wake wave aft of the hull 20, rather than being released and carried aft in the air aft of the hull 20. It is preferred that at least one wing-shaped portion 92 be attached to the exhaust pipe 90 between the exhaust pipe 90 and the hull bottom 29. The at least one wing-shaped portion 92 preferably has a portion with a height of approximately 120-150 mm, and a length approximately 4-5 times an outer diameter of the exhaust opening 92. The above-described combination of structural features results in the wake wave closing above the exhaust gasses, thereby not allowing the exhaust gases to exit the water into the air in the wake of the boat 10, and hence avoiding discomfort to the wakesurfer.

In accordance with the invention, and as broadly embodied in FIG. 15, the propulsion system 80 includes a propeller 100. The propeller 100 includes a hub and at least three propeller blades 104. The hub and the blades define a disk 102. The disk 102 defines a first circle $C_1$ having a first diameter $D_1$, and a first area $A_1=(\pi/4)D_1^2$. The total area of the blades 104 defined by the projected blade area on the surface of the disc 102, defines a second area A2. Propulsion in the dynamic surfing mode $M_{sd}$ (discussed below) requires high efficiency at high load on the propeller. In the dynamic surfing mode $M_{sd}$, the propeller 100 needs to propel the boat 10 up to an optimum surfing speed. This requires a large thrust at a relatively low speed, thereby placing a high load on the blades 104. Transmission of maximum thrust and power to the water requires a large blade area. In addition, if the blade area is too small, the water is unable to carry the load and will start to cavitate in the wake, reducing propeller efficiency and thrust. Wakesurfing boat 10, in accordance with the invention, operating in the dynamic surfing mode $M_{sd}$, with a large amount of ballast, enjoys maximum thrust and propeller efficiency because the second area A2, defined by a sum of the area of the projected area of the blades 104, is larger than 70% of the first area $A_1$ of the first circle $C_1$ defined by the disc 102. Use of a ducted propeller as the propeller 100 also is contemplated and within the scope of the invention.

As embodied in FIGS. 16-19, interaction of the ballast system and the propulsion system, with resultant changes in ballast volume, ballast weight, and boat displacement and trim, results in at least three different modes of operation for the wakesurfing boat 10, i.e., a cruising mode $M_c$ (FIG. 16), with the ballast tanks empty, and the boat 10 being propelled through the surface water; a static surfing mode $M_{ss}$ (FIG. 17), with the ballast tanks in the process of filling, or full, and the boat 10 sitting static in the surface water; and the dynamic surfing mode $M_{sd}$ (FIG. 18), with the ballast tanks full, and the boat 10 being propelled through the surface water. In the dynamic surfing mode $M_{sd}$, as a result of the greater hull displacement, greater propeller thrust, greater propeller efficiency, optimized L/B ratio, and minimized losses in the wake resulting from the rounded aft hull bottom and the rounded aft body hull, intersecting with the transom and the bulwarks, a wake wave is created with an improved height, steepness, crest smoothness, face smoothness, and duration, all of which are very desirable for surfing. FIG. 19 graphically depicts a wave in the wake of the above-described preferred embodiment of the wakesurfing boat 10, in accordance with the invention, including a starboard wave component W1 and a port wave component W2, created by the wakesurfing boat 10 operating in the dynamic surfing mode $M_{sd}$. Each of the wake wave components W1 and W2 defines a relatively large, relatively long-lasting, and relatively well-shaped wake wave, mimicking as closely as possible an ocean wave, thereby providing the wakesurfer a long satisfying surfing experience substantially similar to that of an ocean surfer.

What is claimed is:

1. A wakesurfing boat comprising:
   a hull, the hull comprising:
   a bow;
   a stern;
   a starboard bulwark;
   a port bulwark;
   a transom positioned at the stern, the transom having starboard and port points between the starboard and port bulwarks;
   a length L between the bow and the stern;
   a beam B between the starboard and port bulwarks
   a bottom;
   a deck;
   a centerline extending between the bow and the stern midway between the port and starboard bulwarks;
   a rounded aft hull body intersecting the transom, the starboard bulwark, and the port bulwark, the rounded aft hull body including:
   a starboard arcuate portion extending outboard from the starboard bulwark proximate the stern, the starboard arcuate portion connecting the starboard point of the transom to a position on the starboard bulwark intermediate the starboard point on the transom and the bow, the starboard arcuate portion defining a partial arc of a starboard ellipse, the starboard ellipse defined on the deck at the starboard side of the hull proximate the stern, the starboard ellipse having a starboard major radius, the starboard major radius being equal to approximately 0.2 (L) to 0.4(L), and a starboard minor radius, the starboard minor radius being equal to approximately 0.2(B) to 0.3(B); and
   a port arcuate portion extending outboard from the port bulwark proximate the stern, the port arcuate portion connecting the port point of the transom to a position on the port bulwark intermediate the port point on the transom and the bow, the port arcuate portion defining a partial arc of a ort ellipse, the port ellipse defined on the deck at the port side of the hull proximate the stern, the port ellipse having a port major radius, the port major radius being equal to approximately 0.2(L) to 0.4(L), and a port minor radius, the port minor radius being equal to approximately 0.2(B) to 0.3(B);

wherein the starboard arcuate portion and the port arcuate portion intersect the starboard and port points on the transom, respectively to define a width between the starboard point of the transom and the port arc of the transom which is less than the beam B; and wherein the starboard partial arc of the starboard ellipse defining the starboard arcuate portion and the port partial arc of the port ellipse defining the port arcuate portion, thereby defining the rounded aft hull body, are configured to minimize losses in a wake wave;

a ballast system; and a propulsion system.

2. The wakesurfing boat of claim 1, wherein the major radius of each of the starboard ellipse and port ellipse is equal to 0.3(L), and the minor radius of each of the starboard ellipse and the port ellipse is equal to 0.24(B).

3. The wakesurfing boat of claim 1, further comprising a L/B ratio of approximately 3.1 to 3.3.

4. The wakesurfing boat of claim 3, wherein the L/B ratio is equal to 3.21.

5. The wakesurfing boat of claim 1, wherein the bottom comprises a substantial M-shaped portion and a substantial V-shaped portion.

6. The wakesurfing boat of claim 1, wherein a length of each of the respective starboard and port positions on the respective starboard and port bulwarks, measured from the respective starboard and port points on the transom, is approximately 0.3(L).

7. The wakesurfing boat of claim 1, wherein the respective starboard and port points on the transom are located at respective starboard and port sides of the centerline, spaced away from the centerline by a distance equal to approximately 0.26(B).

8. The wakesurfing boat of claim 5, wherein the substantial M-shaped portion extends along the bottom of the hull from a first position proximate the bow to a second position located approximately 0.4(L) to approximately 0.5(L) aft of the bow.

9. The wakesurfing boat of claim 8, wherein the substantial V-shaped portion extends from the transom to approximately the second position.

10. The wakesurfing boat of claim 8, wherein the substantial V-shaped portion defines an angle of approximately 10° at the stern, the angle decreasing to approximately 7° at the second position.

11. The wakesurfing boat of claim 1, wherein the propulsion system comprises at least an engine, an engine exhaust pipe with an exhaust opening, and a propeller.

12. The wakesurfing boat of claim 11, wherein the exhaust pipe is attached to a wing-shaped body depending from the bottom and submerged below the transom.

13. The wakesurfing boat of claim 12, wherein the exhaust opening is defined in the exhaust pipe forward of the transom.

14. The wakesurfing boat of claim 12, wherein the wing-shaped body has a length approximately 4.0 to 5.0 times greater than a diameter of the exhaust opening.

15. The wakesurfing boat of claim 11, wherein the propeller has a preselected blade area, and a preselected disc area, the preselected blade area being larger than 70% of the preselected disc area.

16. The wakesurfing boat of claim 1, wherein the ballast system comprises a plurality of ballast tanks adapted to hold selected amounts of ballast water, a plurality of pipes, pumps, and valves adapted to transfer the ballast water inboard and overboard.

17. The wakesurfing boat of claim 16, further comprising a controller for controlling operation of the ballast system and the propulsion system, adapted to operate the boat in at least one of a cruising mode, a static surfing mode, and a dynamic surfing mode.

18. The wakesurfing boat of claim 1, further comprising a rounded portion on the bottom proximate the transom, the rounded portion having a maximum radius related to the beam B, and defining a fillet between the bottom and the starboard and port bulwarks proximate the starboard and port points on the transom.

19. The wakesurfing boat of claim 18, wherein a maximum radius of the rounded portion on the bottom related to the beam B is 0.03(B) to 0.05 (B).

20. The wakesurfing boat of claim 19, wherein the maximum radius of the rounded portion on the bottom related to the beam is 0.04(B).

21. The wakesurfing boat of claim 1, wherein the width between the starboard point on the transom and the port point on the transom is approximately 0.52(B).

* * * * *

UNITED STATES PATENT AND TRADEMARK OFFICE
CERTIFICATE OF CORRECTION

| | | |
|---|---|---|
| PATENT NO. | : 9,242,700 B1 | Page 1 of 1 |
| APPLICATION NO. | : 14/676305 | |
| DATED | : January 26, 2016 | |
| INVENTOR(S) | : Albert Viviani et al. | |

It is certified that error appears in the above-identified patent and that said Letters Patent is hereby corrected as shown below:

In the Claims:

Column 8, line 63, claim 1:
Change "0.2 (L)" to -- 0.2(L) --.

Column 9, line 4, claim 1:
Change "ort ellipse" to -- port ellipse --.

Signed and Sealed this
Twenty-sixth Day of July, 2016

Michelle K. Lee
*Director of the United States Patent and Trademark Office*